US012302133B2

(12) United States Patent
Lin et al.

(10) Patent No.: US 12,302,133 B2
(45) Date of Patent: May 13, 2025

(54) AUTOMATIC UPGRADE PLANNING

(71) Applicant: Juniper Networks, Inc., Sunnyvale, CA (US)

(72) Inventors: May Zar Lin, San Jose, CA (US); Keh-Ming Luoh, Fremont, CA (US); Yashwanth Venkata Krishna Chanamolu, Dublin, CA (US); Jacob Thomas, Saratoga, CA (US); Wenfeng Wang, Cupertino, CA (US); Wesley Purvis, Yardley, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 328 days.

(21) Appl. No.: 17/804,780

(22) Filed: May 31, 2022

(65) Prior Publication Data
US 2023/0388819 A1   Nov. 30, 2023

(51) Int. Cl.
   *H04W 24/04*   (2009.01)
   *H04B 17/318*  (2015.01)
   *H04W 24/02*   (2009.01)
   *H04W 24/08*   (2009.01)
   *H04W 88/08*   (2009.01)

(52) U.S. Cl.
   CPC .......... *H04W 24/04* (2013.01); *H04B 17/318* (2015.01); *H04W 24/02* (2013.01); *H04W 24/08* (2013.01); *H04W 88/08* (2013.01)

(58) Field of Classification Search
   CPC ..... H04W 24/04; H04W 24/02; H04W 24/08; H04W 88/08; H04B 17/318
   See application file for complete search history.

(56) References Cited

U.S. PATENT DOCUMENTS

| | | | |
|---|---|---|---|
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,985,883 B2 | 5/2018 | MeLampy et al. |
| 10,200,264 B2 | 2/2019 | Menon et al. |

(Continued)

OTHER PUBLICATIONS

U.S. Appl. No. 17/303,222, filed May 24, 2021, naming inventors Safavi et al.

(Continued)

*Primary Examiner* — Ajay Cattungal
(74) *Attorney, Agent, or Firm* — Shumaker & Sieffert, P.A.

(57) ABSTRACT

Techniques are described by which a network management system (NMS) receives, from a plurality of access points (APs) configured to provide a wireless network, received signal strength indicator (RSSI) values. The NMS generates, based on the RSSI values, a graph of the plurality of APs, wherein the graph of the plurality of APs includes a plurality of clusters, wherein each cluster comprises a subset of the plurality of APs that are grouped based on strength of connectivity between the subset of the plurality of APs. The NMS generates, based on the graph, an upgrade plan to upgrade the plurality of APs, wherein the upgrade plan comprises a plurality of batches, wherein each batch includes a selection of at least one AP from each of one or more of the plurality of clusters. The NMS sends the upgrade plan to an orchestrator to execute the upgrade plan.

20 Claims, 10 Drawing Sheets

(56) References Cited

U.S. PATENT DOCUMENTS

| | | | |
|---|---|---|---|
| 10,277,506 B2 | 4/2019 | Timmons et al. | |
| 10,432,522 B2 | 10/2019 | Kaplan et al. | |
| 10,756,983 B2 | 8/2020 | Ratkovic et al. | |
| 10,862,742 B2 | 12/2020 | Singh | |
| 10,958,537 B2 | 3/2021 | Safavi | |
| 10,958,585 B2 | 3/2021 | Safavi | |
| 10,985,969 B2 | 4/2021 | Safavi | |
| 10,992,543 B1 | 4/2021 | Rachamadugu et al. | |
| 2008/0137621 A1* | 6/2008 | Bheda | H04W 24/04 370/338 |
| 2017/0303172 A1* | 10/2017 | Hirudayaraj | H04W 36/0085 |
| 2018/0167277 A1* | 6/2018 | Mahimkar | H04L 41/082 |
| 2018/0332557 A1* | 11/2018 | Vuornos | G06F 8/61 |
| 2018/0332558 A1* | 11/2018 | Chan | H04W 24/02 |
| 2019/0380048 A1* | 12/2019 | Desai | H04L 41/0893 |
| 2020/0099578 A1 | 3/2020 | Venkateshwaren | |
| 2020/0322216 A1* | 10/2020 | Singla | H04L 41/0806 |
| 2020/0403890 A1 | 12/2020 | McCulley et al. | |
| 2021/0306201 A1 | 9/2021 | Wang et al. | |

OTHER PUBLICATIONS

Extended Search Report from counterpart European Application No. 22191768.5 dated May 19, 2023, 9 pp.

Response to Extended Search Report dated May 19, 2023, from counterpart European Application No. 22191768.5 filed Jun. 6, 2024, 24 pp.

\* cited by examiner

AUTOMATIC UPGRADE PLANNING

TECHNICAL FIELD

The disclosure relates generally to computer networks and, more specifically, to upgrade planning of devices in computer networks.

BACKGROUND

Commercial premises, such as offices, hospitals, airports, stadiums, or retail outlets, often include a network of wireless access points (APs) installed throughout the premises to provide wireless network services to one or more wireless devices. APs enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

The firmware or software of APs or other devices in the network may be periodically upgraded and/or updated to improve performance and/or fix issues with the current firmware or software implemented by the APs or other devices. When the APs or other devices are being upgraded, the APs or other devices are typically rebooted or taken offline, which may cause disruptions to services provided by or access through the APs or devices.

SUMMARY

In general, this disclosure describes techniques for generating an upgrade plan to selectively upgrade devices in a wireless network. For example, a site, such as a site for an enterprise, may include a plurality of access points (APs) configured to provide one or more wireless networks for client devices. A network management system (NMS) may manage the plurality of APs and/or other devices in the network, such as by providing an upgrade plan that selectively upgrades APs or other devices in the wireless network, in accordance with the techniques described in this disclosure.

For example, each AP of the plurality of APs at a site may measure a strength of the connectivity to other APs. For instance, each AP may measure a received signal strength indicator (RSSI) value that indicates the strength of a radio signal (e.g., in decibel-milliwatt (dBm)) detected from another AP. The NMS obtains the RSSI values from the plurality of APs in the network and generates, based on the RSSI values, a graph-based representation of the plurality of APs (also referred to herein as a "Radio Resource Management (RRM) graph") and their connectivity to one another. The NMS may group APs within the graph based on strength of the connectivity between the APs, e.g., grouping APs that measured RSSI values detected between the APs that are above a particular RSSI threshold value. Each group of strongly connected APs may be referred to herein as a "cluster" of strongly connected APs. Based on the graph of the plurality of APs grouped into clusters, the NMS may generate an upgrade plan that selectively upgrades a batch of APs at a time, where the batch of APs includes at least one AP from each of one or more clusters until the plurality of APs is upgraded. The NMS may then send the upgrade plan to an orchestrator of the site to execute the upgrade plan.

The techniques of the disclosure may provide one or more technical advantages and practical applications. For example, by generating an upgrade plan that selectively upgrades at least one AP from each of one or more clusters in batches, the APs may be upgraded in a way that is faster than serially and iteratively upgrading software or firmware across APs one at a time (referred to as "serial" upgrading), but is less risky than upgrading all APs simultaneously (referred to as "big bang" upgrading). For example, by selectively upgrading at least one AP from each of one or more clusters of strongly connected APs in parallel, disruptions to wireless network services provided by the APs may be reduced and/or mitigated because the other APs within a given cluster may provide backup wireless network services in the event the at least one AP being upgraded is unavailable. Moreover, by upgrading at least one AP from each of one or more clusters in batches in parallel, the process to upgrade the APs is faster than serially and iteratively upgrading the APs one at a time. That is, the techniques of the disclosure provide a middle ground approach that may reduce and/or mitigate disruptions caused by an upgrade process to wireless network services provided by the APs without compromising the speed at which to upgrade APs in the network. Additionally, by selectively upgrading at least one AP from each of the one or more clusters of strongly connected APs to be upgraded, the upgrade process may avoid randomly selecting APs for a batch that may all provide wireless network services for one or more client devices in a certain region of a site, which would cause a disruption to the wireless network services if these randomly selected APs are to be upgraded in parallel.

In one example, the disclosure is directed to a network management system comprising: one or more processors; and a memory comprising instructions that when executed by the one or more processors cause the one or more processors to: receive, from a plurality of access points (APs) configured to provide a wireless network, received signal strength indicator (RSSI) values that each specify a strength of a radio signal detected by an AP of the plurality of APs from another AP of the plurality of APs; generate, based on the RSSI values, a graph of the plurality of APs, wherein the graph of the plurality of APs includes a plurality of clusters, wherein each cluster of the plurality of clusters comprises a subset of the plurality of APs that are grouped based on strength of connectivity between the subset of the plurality of APs, wherein the strength of connectivity is determined from the RSSI values; generate, based on the graph of the plurality of APs, an upgrade plan to upgrade the plurality of APs, wherein the upgrade plan comprises a plurality of batches, wherein each batch of the plurality of batches includes a selection of at least one AP from each of one or more of the plurality of clusters to be upgraded in parallel; and send the upgrade plan to an orchestrator to execute the upgrade plan.

In one example, the disclosure is directed to a method comprising: receiving, from a plurality of access points (APs) configured to provide a wireless network, received signal strength indicator (RSSI) values that each specify a strength of a radio signal detected by an AP of the plurality of APs from another AP of the plurality of APs; generating, based on the RSSI values, a graph of the plurality of APs, wherein the graph of the plurality of APs includes a plurality of clusters, wherein each cluster of the plurality of clusters comprises a subset of the plurality of APs that are grouped based on strength of connectivity between the subset of the plurality of APs, wherein the strength of connectivity is determined from the RSSI values; generating, based on the graph of the plurality of APs, an upgrade plan to upgrade the plurality of APs, wherein the upgrade plan comprises a plurality of batches, wherein each batch of the plurality of batches includes a selection of at least one AP from each of one or more of the plurality of clusters to be upgraded in parallel; and sending the upgrade plan to an orchestrator to execute the upgrade plan.

In one example, the disclosure is directed to a non-transitory computer-readable storage medium comprising instructions that, when executed, configure processing circuitry to: receive, from a plurality of access points (APs) configured to provide a wireless network, received signal strength indicator (RSSI) values that each specify a strength of a radio signal detected by an AP of the plurality of APs from another AP of the plurality of APs; generate, based on the RSSI values, a graph of the plurality of APs, wherein the graph of the plurality of APs includes a plurality of clusters, wherein each cluster of the plurality of clusters comprises one or more APs of the plurality of APs that are grouped based on strength of connectivity between the one or more APs, wherein the strength of connectivity is determined from the RSSI values; generate, based on the graph of the plurality of APs, an upgrade plan to upgrade the plurality of APs, wherein the upgrade plan comprises a plurality of batches, wherein each batch of the plurality of batches includes a selection of at least one AP from each of one or more of the plurality of clusters to be upgraded in parallel; and send the upgrade plan to an orchestrator to execute the upgrade plan.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
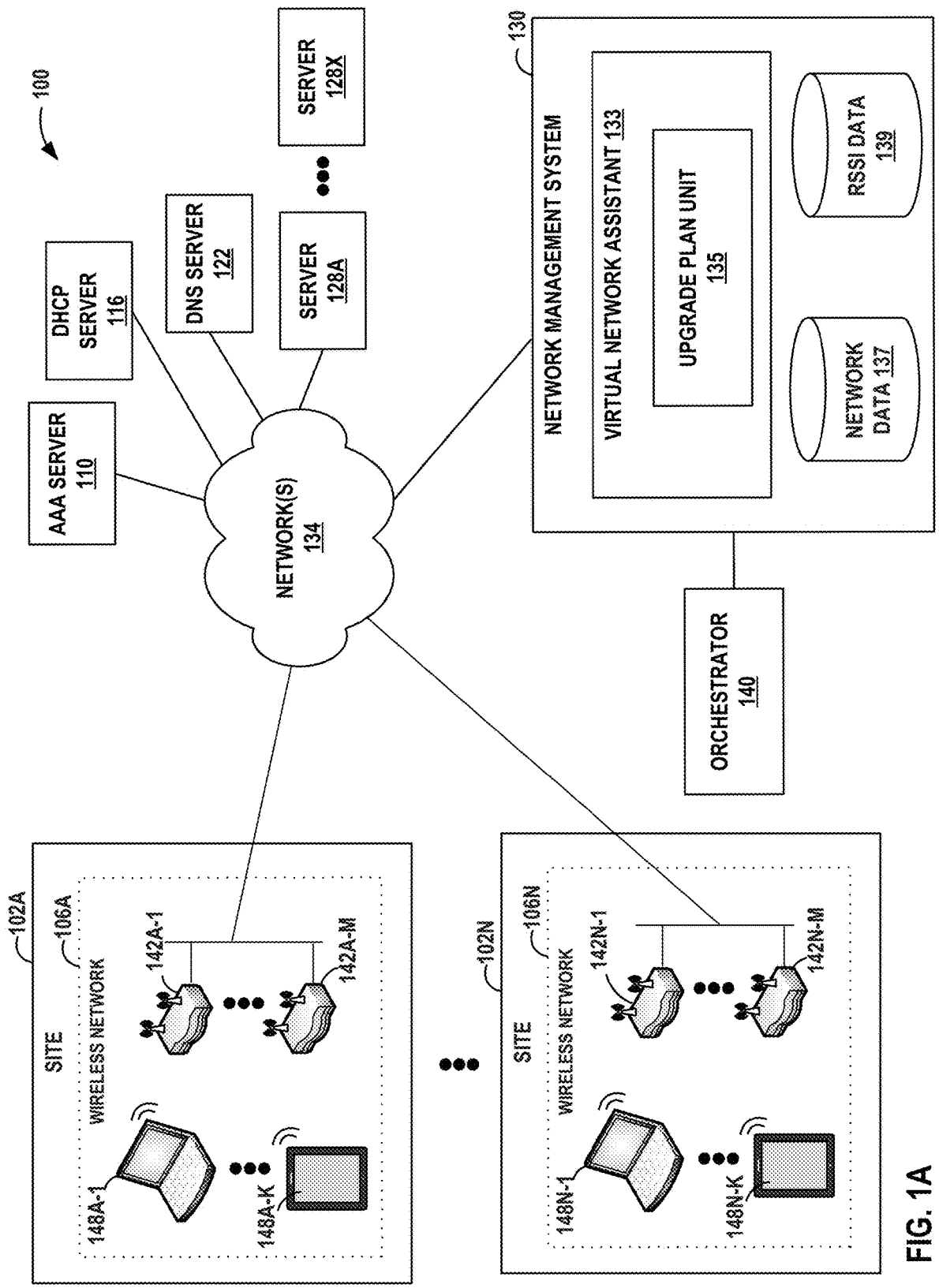
FIG. 1A is a block diagram of an example network system providing an upgrade plan to selectively upgrade devices in a wireless network, in accordance with one or more techniques of the disclosure.

FIG. 1A is a diagram of an example network system 100 that provides an upgrade plan to selectively upgrade devices in a wireless network. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as enterprises, offices, hospitals, airports, stadiums, or retail outlets, often install complex wireless network systems, including a network of wireless access points (APs), e.g., APs 142, throughout the premises to provide wireless network services to one or more wireless client devices. In this example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, APs 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more APs 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more APs 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with APs 142 and/or nodes within network 134. For example, VNA 133 of NMS 130 may include a network performance engine that automatically determines one or more service level exception (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks a received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the APs 142 that indicates a strength of a radio signal detected from another AP 142. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor wireless network performance metrics detected or predicted from the streams of event data. VNA 160 may generate a notification indicative of the root cause and/or one or more remedial actions that may be taken to address the root cause of the error conditions or poor wireless network performance metrics. In some examples, if the root cause may be automatically resolved, VNA 160 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 160 may be part of the NMS 130, may execute on other servers or execution environments, or may be distributed to nodes within network 134 (e.g., routers, switches, controllers, gateways and the like). Example details of these and other operations implemented by the VNA 160 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

APs 142 at a site 102 may be periodically upgraded with software or firmware to improve the performance of APs 142 and/or to fix issues with the current software or firmware implemented by APs 142, such as security issues. When software or firmware is being upgraded, APs 142 are typically rebooted or otherwise taken offline. This may cause disruptions to wireless network services provided by the APs 142 at site 102 that are being upgraded. Some existing solutions may reduce or mitigate the disruptions to the wireless network services caused by the upgrading process. For example, one solution is to upgrade all the APs at a site simultaneously (also referred to as a "big bang" upgrading process). By upgrading all the APs simultaneously, the upgrade process may occur faster. However, upgrading all the APs simultaneously will cause complete disruption of the wireless network services at the site. Another solution to reduce or mitigate disruptions to wireless network services caused by the upgrading process is to upgrade APs at a site serially and iteratively (also referred to as a "serial" upgrading process) one at a time. By upgrading the APs serially and iteratively, the risk of disruptions to wireless network services at the site is reduced. However, upgrading the APs serially and iteratively is a slow process. Another solution to reduce or mitigate disruptions to wireless network services caused by the upgrading process is to upgrade APs in batches (also referred to as a "canary" upgrading process). However, these solutions randomly select devices for each batch, which in some instances may select all devices that can provide wireless network services for one or more client devices in a certain region of the site and cause a disruption to the wireless network services for at least the certain region of the site when the devices are being upgraded.

In accordance with the techniques described in this disclosure, VNA 133 may include an upgrade plan unit 135 that provides an upgrade plan to selectively upgrade APs 142 or other radio-based devices in each of sites 102 of network system 100. In sites 102 of network system 100, an AP that has a strong connection to another AP (e.g., RSSI value above a particular RSSI threshold value) may provide backup wireless network services in the event the other AP is unavailable, e.g., when the AP is upgrading its software or firmware. The techniques may provide an upgrade plan to selectively upgrade at least one AP from two or more groups of strongly connected APs in parallel such that the selected APs are upgraded in batches. In this way, when the APs that are being upgraded are rebooted or are otherwise offline, the other APs in each group of strongly connected APs may provide backup wireless network services for the offline AP in the respective group.

As one example, NMS 130 may obtain RSSI values measured by APs 142. For example, NMS 130 may receive, from each of APs 142, RSSI values measured by APs 142 that indicate the AP's strength in detecting radio signals from other APs (e.g., connectivity to the other APs). NMS 130 may store the RSSI values obtained from APs 142 in RSSI data 139. Based on the RSSI values from each of APs 142, NMS 130 may generate a graph-based representation of the connectivity between APs 142 in site 102A network system 100, e.g., a Radio Resource Management (RRM) graph.

In some examples, network system 100 may include a large number of connections between APs 142. In these examples, NMS 130 may filter the graph of APs 142 to reduce the number of connections between APs within the graph and thus manage fewer APs for the upgrade plan. For example, AP 142A-M may detect radio signals from ten other APs. In this example, NMS 130 may filter the graph of APs 142 to include a subset of the ten other APs, such as five APs from the ten APs with the strongest connectivity to AP 142A-M.

Upgrade plan unit 135 of NMS 130 may group APs within the graph based on strength of the connectivity between the APs. As one example, upgrade plan unit 135 may group APs that have a strong connection between them (e.g., RSSI value above a particular RSSI threshold value). For instance, AP 142A-1 may detect a radio signal to AP 142A-M and AP 142A-M may also detect a radio signal to AP 142A-1, where each radio signal has an RSSI value above a particular RSSI threshold value. AP 142A-1 may not detect a radio signal (or detect a weak radio signal) to other APs in site 106A. In this example, upgrade plan unit 135 may group a subset of one or more APs 142, e.g., APs 142A-1 and 142A-M, within the graph as a group of strongly connected APs, and similarly group one or more other subsets of APs within site 106A. Each group of strongly connected APs may be referred to herein as a "cluster" of strongly connected APs. In some examples, upgrade plan unit 135 may implement one or more clustering algorithms including K-means, mean-shift, spectral clustering, and/or other clustering algorithms to group strongly connected APs together and/or to separate clusters of strongly connected APs from each other.

Upgrade plan unit 135 may generate an upgrade plan to selectively upgrade at least one AP 142 from each of one or more clusters of strongly connected APs 142 in batches. For example, the upgrade plan may specify a first batch of one AP from each of six clusters to perform the upgrade in parallel at a first time, specify a second batch of at least one different AP from each of the six clusters to perform the upgrade in parallel at a second time, and so on until the APs at the site are upgraded. In some examples, the upgrade plan may include certain batches that select one AP from less than all of the clusters of strongly connected APs, e.g., due to the clusters not including an equal number of APs.

As further described below, upgrade plan unit 135 may generate an upgrade plan based on one or more configurable parameters. The configurable parameters may include a specification of one or more particular APs within the site to be upgraded or to upgrade all APs at the site, the number of APs from each cluster to be upgraded in parallel, an order in which to upgrade APs within each cluster, a direction in which to upgrade APs within each cluster, whether to ramp up or ramp down the upgrade process over time, and/or other parameters that may specify how to perform the upgrade process (e.g., error threshold to cancel upgrade process from continuing).

In response to generating the upgrade plan, upgrade plan unit 135 may send the upgrade plan to an orchestrator (not shown) that may manage and configure APs in a given site 102. For example, the orchestrator may execute the upgrade plan and performs the upgrade process to the selected APs in accordance with the upgrade plan.

Figure 1B:
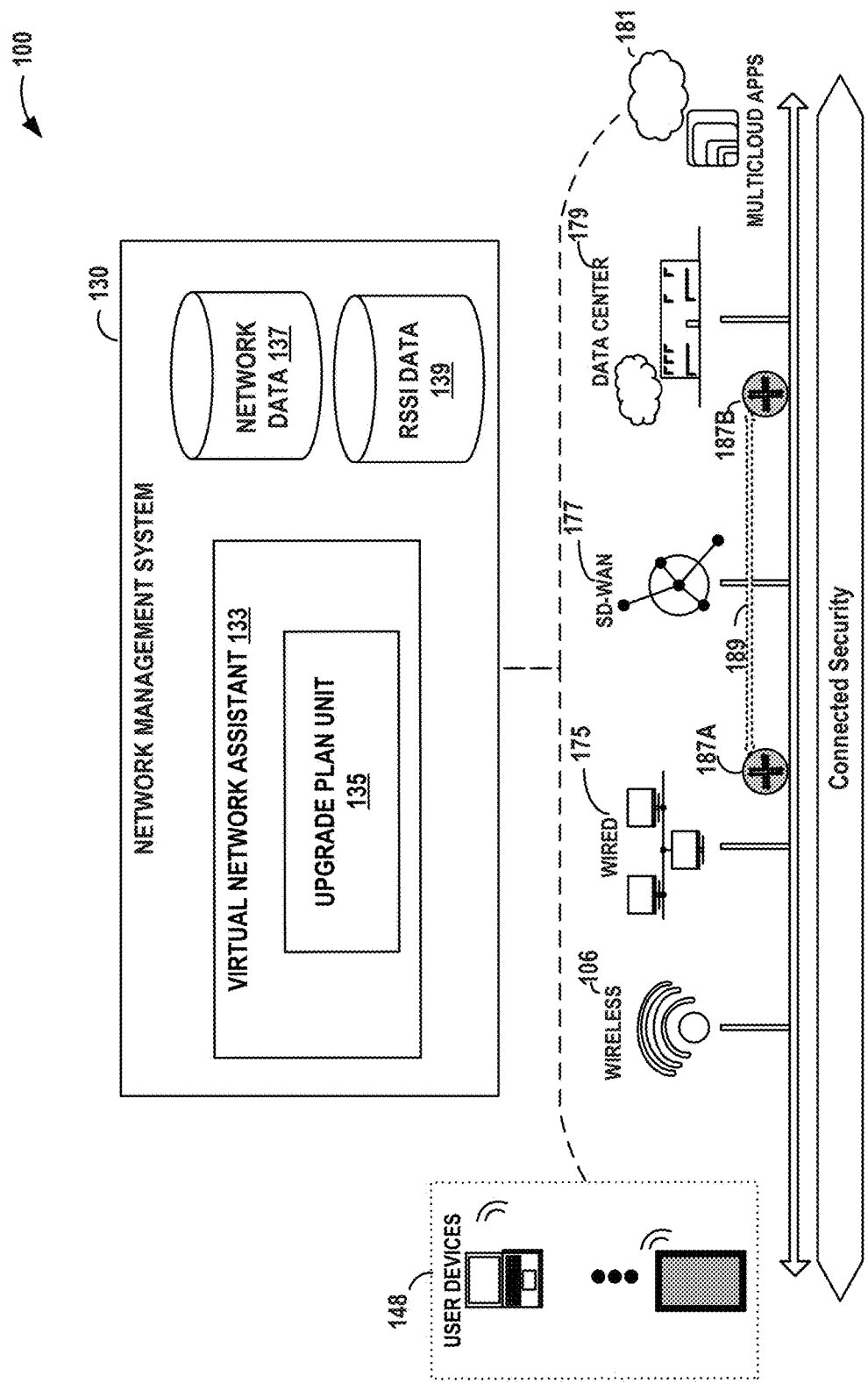
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
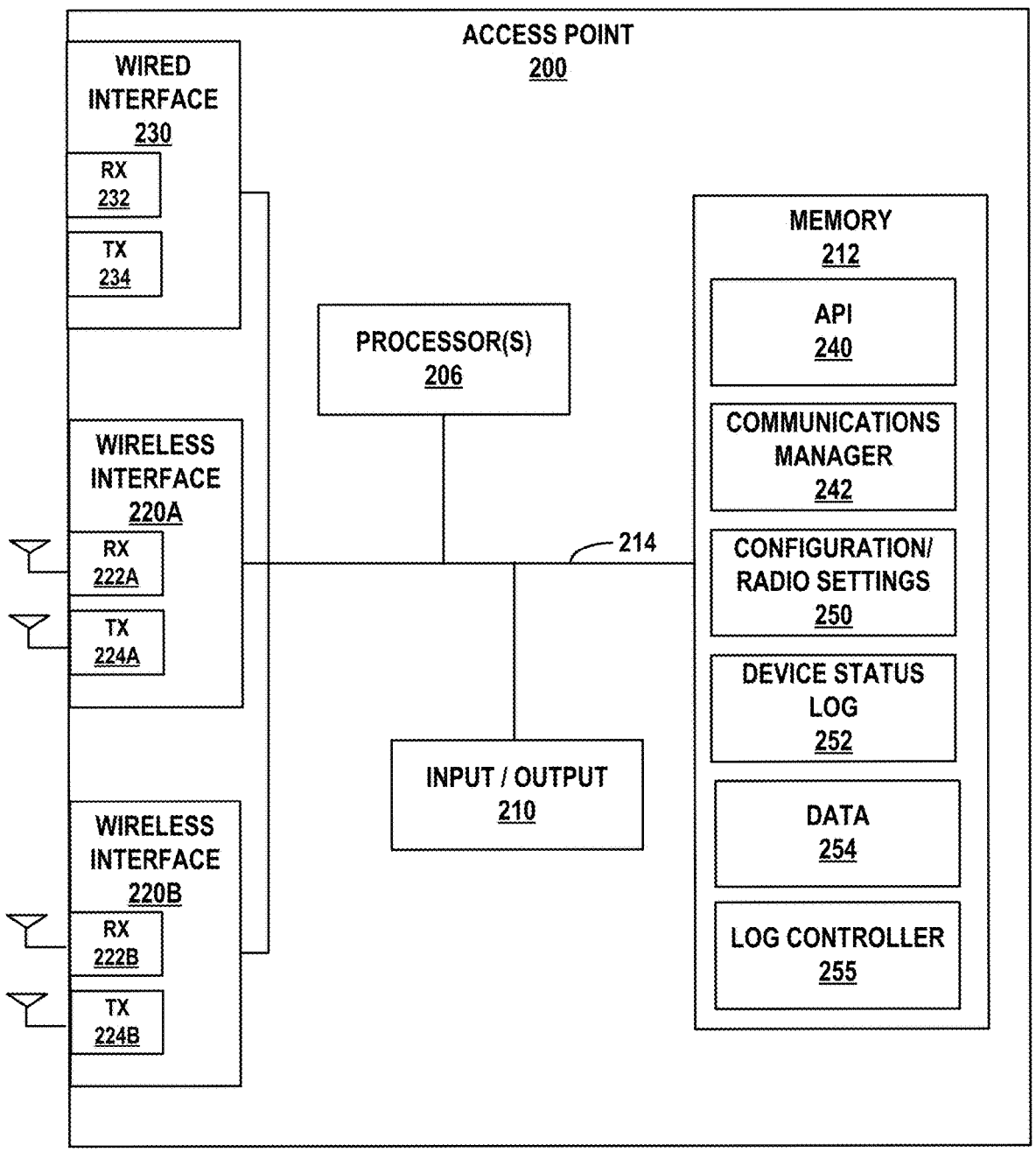
FIG. 2 is a block diagram of an example access point device in accordance with one or more techniques of the disclosure.

FIG. 2 is a block diagram of an example access point (AP) 200 configured in accordance with one or more techniques of the disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B, one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP 200 and/or client devices currently or previously associated with AP 200. The network data may include, for example, any network parameter and/or network data indicative of one or more aspects of performance of the wireless network or of the AP 200 itself In some examples, the network data may include a plurality of states measured periodically as time series data. The network data may be measured by the UE devices 148 and transmitted to AP 200, may be measured by AP 200 itself or by any other device associated with the wireless network and transmitted to AP 200.

Network data stored in data storage 254 may include, for example, AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, etc., as well as a time and date stamp for each event. Log controller 255 determines a logging level for the device based on instructions from NMS 130. Data 254 may store any data used, generated, and/or measured by access point 200, including data collected from UEs 148. Data 254 may include connectivity data such as the strength of connectivity between AP 200 and other APs, that is transmitted to NMS 130 for cloud-based management of wireless networks 106A. For example, AP 200 may detect a radio signal from one or more other APs and store information associated with the detected radio signals between AP 200 and other APs in data 254. For example, AP 200 may store, for each detected radio signal, an identifier of the other AP and the RSSI value in data 254.

In response to detecting radio signals from other APs, AP 200 may send the information associated with the detected radio signals to a network management system (such as NMS 130 of FIG. 1A). For example, the AP 200 may send, for each of the detected radio signals between AP 200 and other APs, the RSSI value and, in some examples, the identifier of the other AP of each radio signal detected by AP 200. Based on the connectivity information received from each of the APs in the network, the network management system may generate an upgrade plan to selectively upgrade AP 200 and other APs in the network, in accordance with the techniques described in this disclosure.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3A:
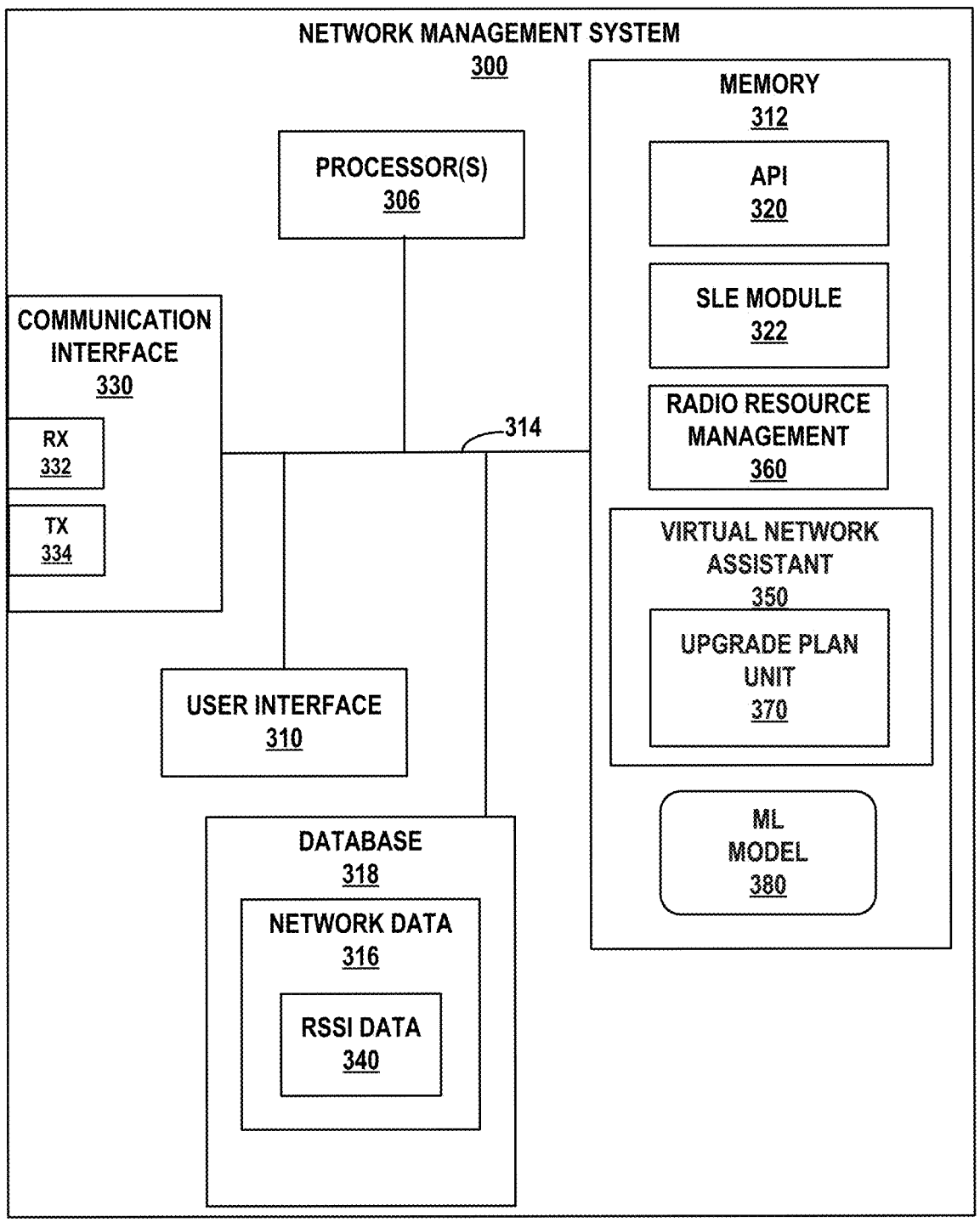
FIGS. 3A and 3B are a block diagrams of an example network management system configured to provide an upgrade plan to selectively upgrade devices in a wireless network, in accordance with one or more techniques of the disclosure.
Figure 3B:
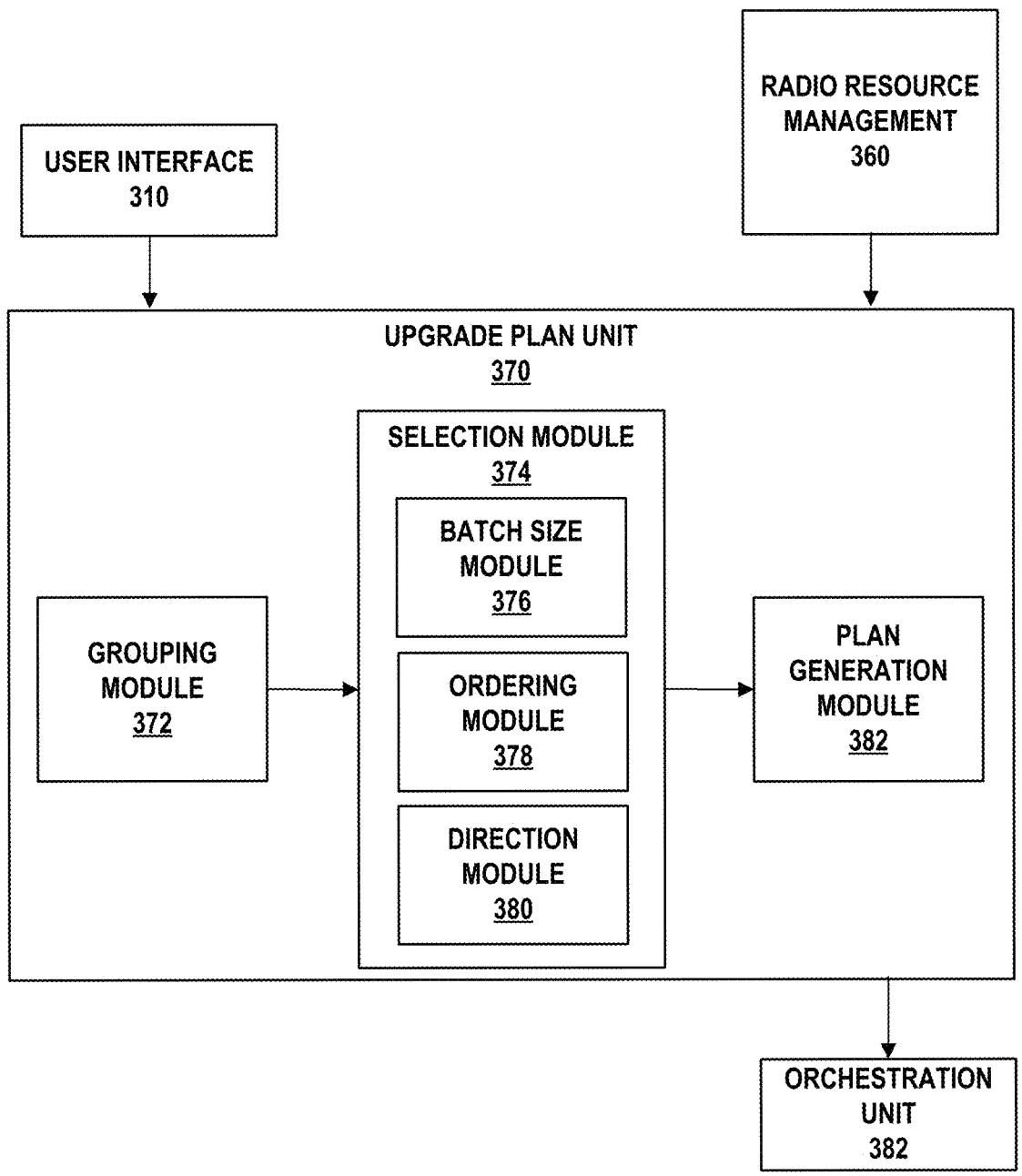

FIGS. 3A and 3B are block diagrams of an example network management system (NMS) 300 configured to provide an upgrade plan to selectively upgrade devices in the wireless network, in accordance with one or more techniques of the disclosure. NMS 300 may represent, for example, an example of NMS 130 in FIGS. 1A and 1B. In such examples, NMS 300 is responsible for monitoring and management of one or more wireless networks 106A-106N at sites 102A-102N, respectively. In some examples, NMS 300 receives network data collected by APs 142, such as network data including connectivity information between APs, and analyzes this data for cloud-based management of the upgrade process of APs 142. In some examples, NMS 300 may be part of another server shown in FIG. 1A or a part of any other server.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of APs 142, servers 110, 116, 122, 128 and/or any other devices or systems forming part of network 100 such as shown in FIG. 1A. The data and information received by NMS 300 may include, for example, network data and/or event log data received from access points 142 used by NMS 300 to remotely monitor and/or control the performance of wireless networks 106A-106N. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, and a machine learning model 380. NMS 300 may also include any other programmed modules, software engines and/or interfaces configured for remote monitoring and management of wireless networks 106A-106N, including remote monitoring and management of any of APs 142.

SLE module 322 enables set up and tracking of thresholds for one or more SLE metrics for each of wireless networks 106A-106N. SLE module 322 further analyzes network data (e.g., stored as network data 316) collected by APs and/or UEs associated with wireless networks 106A-106N, such as any of APs 142 from UEs 148 in each wireless network 106A-106N. For example, APs 142A-1 through 142A-M collect network data from UEs 148A-1 through 148A-K currently associated with wireless network 106A (e.g., named assets, connected/unconnected WiFi clients). This data, in addition to any network data collected by one or more APs 142A-1 through 142A-M in wireless network 106A, is transmitted to NMS 300 and stored as, for example, network data 316. Network data 316 may include data specifying strength of a radio signal of client devices and APs, and/or strength of a radio signal between APs, such as an RSSI value (stored as RSSI data 340). In some examples, RSSI data 340 may be stored in a separate database than network data 316.

NMS 300 executes SLE module 322 to determine one or more SLE metrics for each UE 148 associated with a wireless network 106. One or more of the SLE metrics may further be aggregated to each AP at a site to gain insight into contribution of each AP to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

RRM engine 360 monitors one or more metrics for each site 106A-106N in order to learn and optimize the radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all APs 142 in each network 106A-106N. RRM engine 360 may monitor events, power, channel, bandwidth, and number of clients connected to each AP. RRM engine 360 may obtain the strength of a radio signal of client devices and APs, and/or strength of a radio signal between APs, such as an RSSI value stored in RSSI data 340 or directly from APs. In some examples, RRM engine 360 may generate a graph-based representation of the APs based on RSSI data 340. For example, RRM engine 360 may generate a graph (referred to herein as RRM graph) including nodes representing the APs and each connection between the nodes representing the connectivity of an AP to another AP. Each connection between nodes in the graph may represent the strength of a detected radio signal between the APs. RRM engine 360 may further automatically change or update configurations of one or more APs 142 at a site 106 with an aim to improve the coverage and/or capacity SLE metrics and thus to provide an improved wireless experience for the user.

VNA/AI engine 350 analyzes network data received from APs 142 as well as its own data (e.g., the RRM graph) to monitor performance and/or perform an action to improve performance of wireless networks 106A-106N. For example, VNA engine 350 may identify when anomalous or abnormal states are encountered in one of wireless networks 106A-106N. VNA/AI engine 350 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 350 may automatically invoke one or more remedial actions intended to address the identified root cause(s) of one or more poor SLE metrics. Examples of remedial actions that may be automatically invoked by VNA/AI engine 350 may include, but are not limited to, invoking RRM engine 360 to reboot one or more APs and/or adjust/modify the transmit power of a specific radio in a specific AP, adding service set identifier (SSID) configuration to a specific AP, changing channels on an AP or a set of APs, etc. The remedial actions may further include restarting a switch and/or a router, invoke downloading of new software or firmware to an AP, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

In accordance with the techniques described in this disclosure, VNA engine 350 includes an upgrade plan unit 370. Upgrade plan unit 370 may represent an example implementation of upgrade plan unit 135 of FIGS. 1A and 1B. A more detailed view of upgrade plan unit 370 is described and illustrated in FIG. 3B.

In the example of FIG. 3B, upgrade plan unit 370 may include grouping module 372, selection module 374, and a plan generation module 382. The modules in upgrade plan unit 370 is one example and may include more or fewer modules.

Grouping module 372 may group APs within the RRM graph based on strength of the connectivity between the APs. As one example, upgrade plan unit 370 may receive a graph-based representation of APs in the network, e.g., from RRM engine 360. Grouping module 372 may group APs within the graph based on strength of connection between the APs. For example, grouping module 372 may group a first set of one or more APs ("first cluster") within the graph that have a strong connection (e.g., strength of connection above a particular RSSI threshold value) between each other, group a second set of one or more APs ("second cluster") within the graph that have a strong connection between each other, and so on. In some examples, grouping module 372 may implement one or more clustering algorithms including K-means, mean-shift, spectral clustering, and/or other clustering algorithms to group one or more APs within the graph into a plurality of clusters.

In some examples, grouping module 372 may, prior to grouping the APs into clusters, filter the graph of APs to reduce the number of connections between APs within the graph, and thus reduce the number of APs to manage for the upgrade plan. For example, an AP may detect a radio signal from a large number of APs (e.g., 10 APs) with varying RSSI values, with each of these connections represented in the graph. In this example, grouping module 372 may filter the graph to include a subset of the large number of APs having connectivity to the AP, such as one or more APs having the highest RSSI values from among the large number of APs. In this way, grouping module 372 may filter out one or more APs that do not have the strongest connectivity from among the large number of APs.

Selection module 374 may select, for each batch, at least one AP from each of one or more clusters to be upgraded. In some examples, selection module 374 may select at least one AP from each of the one or more clusters based on one or more configurable parameters. In this example, selection module 374 may include a batch size module 376, an ordering module 378, and a direction module 380. The modules within selection module 374 are only an example and selection module 374 may include more or less modules, or other modules based on other configurable parameters.

In this example, batch size module 376 is configured to apply a batch size to an upgrade plan (e.g., number of APs in each batch to be upgraded in parallel). For example, batch size module 376 may apply a smaller batch size to the upgrade plan to upgrade a fewer number of APs in parallel. In some examples, batch size module 376 may apply a larger batch size to the upgrade plan to upgrade a larger number of APs in parallel. In some examples, batch size module 376 may apply instructions to ramp up or ramp down the upgrade plan. For example, batch size module 376 may apply a smaller batch size to the upgrade plan for one or more initial batches and apply a larger batch size for subsequent batches to the upgrade plan to "ramp up" the upgrade process. In some examples, batch size module 376 may apply a larger batch size to the upgrade plan for one or more initial batches and apply a smaller batch size for subsequent batches to the upgrade plan to "ramp down" the upgrade process. In some examples, batch size module 376 may apply a particular speed at which to ramp up or ramp down the upgrade process (e.g., at which batch to increase or decrease the batch size).

Selection module 374 may include an ordering module 378 configured to apply an ordered selection of the one or more APs from each cluster to perform the upgrade. For example, each cluster of strongly connected APs may be grouped around the one or more APs with the strongest connections of the group. The AP in the center of each cluster may be represented by a center node of the cluster, referred to as a "centroid." In this example, ordering module 378 may be configured to determine, for each cluster, the centroid in the cluster and select the AP represented by the centroid of the cluster to start the upgrade process, followed by selections of APs represented by nodes that are progressively toward the edge of the cluster ("center-to-fringe"). In some examples, ordering module 378 may select the AP represented by an edge node of each cluster, followed by selections of APs represented by nodes that are progressively toward the centroid of the cluster ("fringe-to-center").

Selection module 374 may include a direction module 380 configured to apply a direction to the ordered selection of the one or more APs from each cluster to perform the upgrade. For example, direction module 380 may also apply a direction to the ordered selection of the one or more APs from each cluster to perform the upgrade in a way that avoids upgrading neighboring edge APs of adjacent clusters at the same time since neighboring edge APs of adjacent clusters may provide backup wireless network services for one another. For example, direction module 380 may apply a direction to the ordered selection to start with the centroid AP of each cluster and to subsequently perform an upgrade to APs that are to the right of the AP being upgraded. By applying a direction to the ordered selection of APs to perform the upgrade, the upgrade plan may prevent neighboring edge APs of adjacent clusters from being upgraded at the same time.

Upgrade plan unit 370 may include a plan generation module 382 to generate the upgrade plan specifying the APs selected by selection module 374. In some examples, upgrade plan unit 370 may receive one or more configurable parameters as a Kafka input that specifies, among other things, one or more parameters for the generation or modification of the upgrade plan, such as described in FIGS. 4A-4B below. In these examples, plan generation module 382 may include a Kafka engine to generate a Kafka output specifying the upgrade plan. As further described below, the output generated by plan generation module 382 may specify the parameters of the upgrade plan, such as the organization, the site, intended version of firmware or software, timestamp of when the upgrade plan was generated, the selection of at least one AP from each of one or more clusters to be upgraded in parallel at a time (e.g., batch identifier and one or more APs associated with each batch), a recommended time window to execute the upgrade plan (e.g., recommended start time to execute the upgrade plan and recommended end time to stop the execution of the upgrade plan), a upgrade plan identifier, a request identifier for the request to generate the upgrade plan, whether to ramp up or ramp down the upgrade process, node ordering, a first batch size percentage, a maximum batch size percentage, and/or an action of the upgrade plan, such as to modify an existing upgrade plan, generate a new upgrade plan, etc.

Upgrade plan unit 135 may send the upgrade plan to an orchestrator, e.g., orchestration unit 382 that may manage and configure APs in network system 100. For example, orchestration unit 382 may execute the upgrade plan and performs the upgrade process to the selected APs in accordance with the upgrade plan. In some examples, orchestration unit 382 may represent a computing device that provides cloud-based orchestration of the upgrade plan.

Figure 4A:
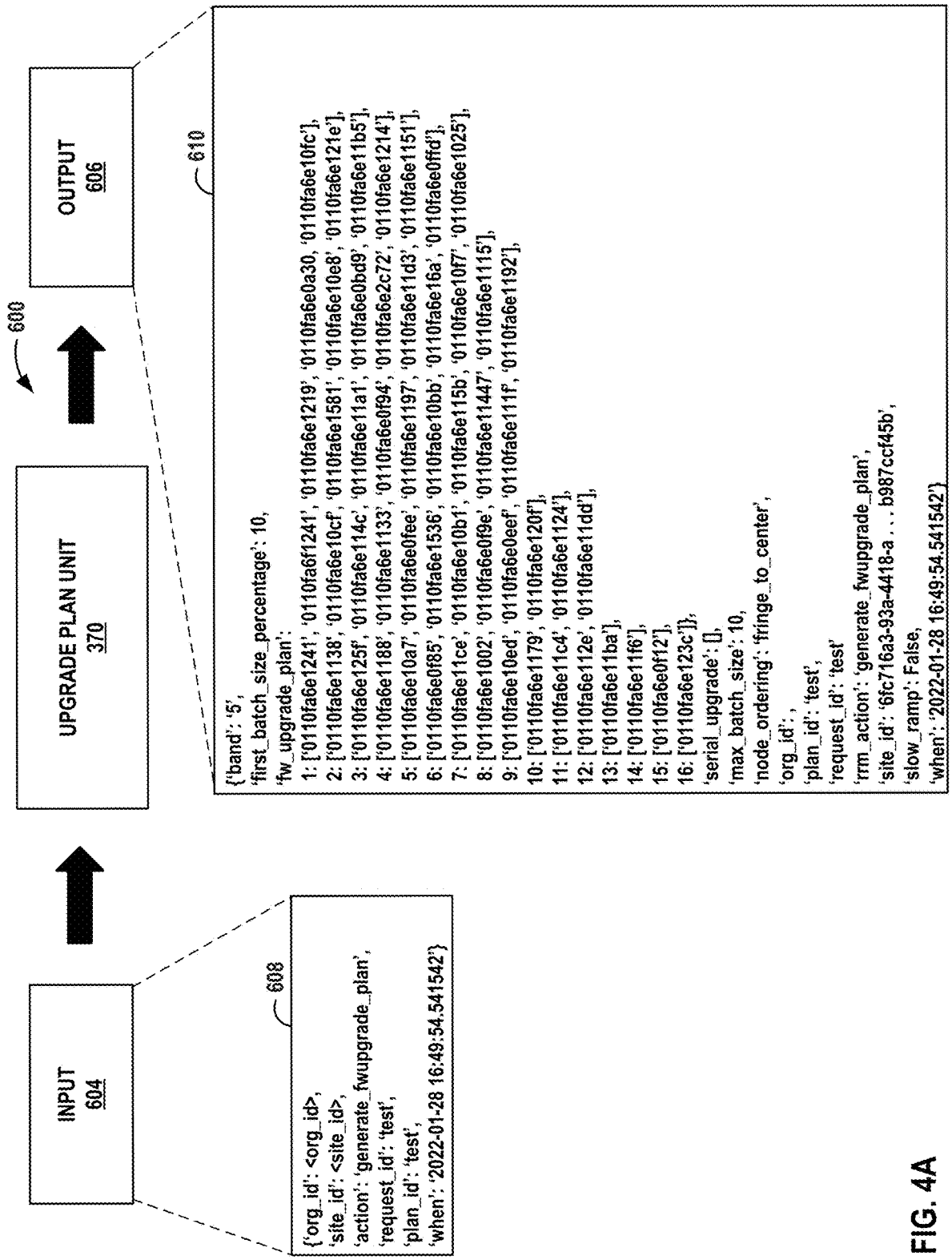
FIGS. 4A-4B illustrate examples of an input and an output of the upgrade plan unit, in accordance with the techniques described in this disclosure.
Figure 4B:
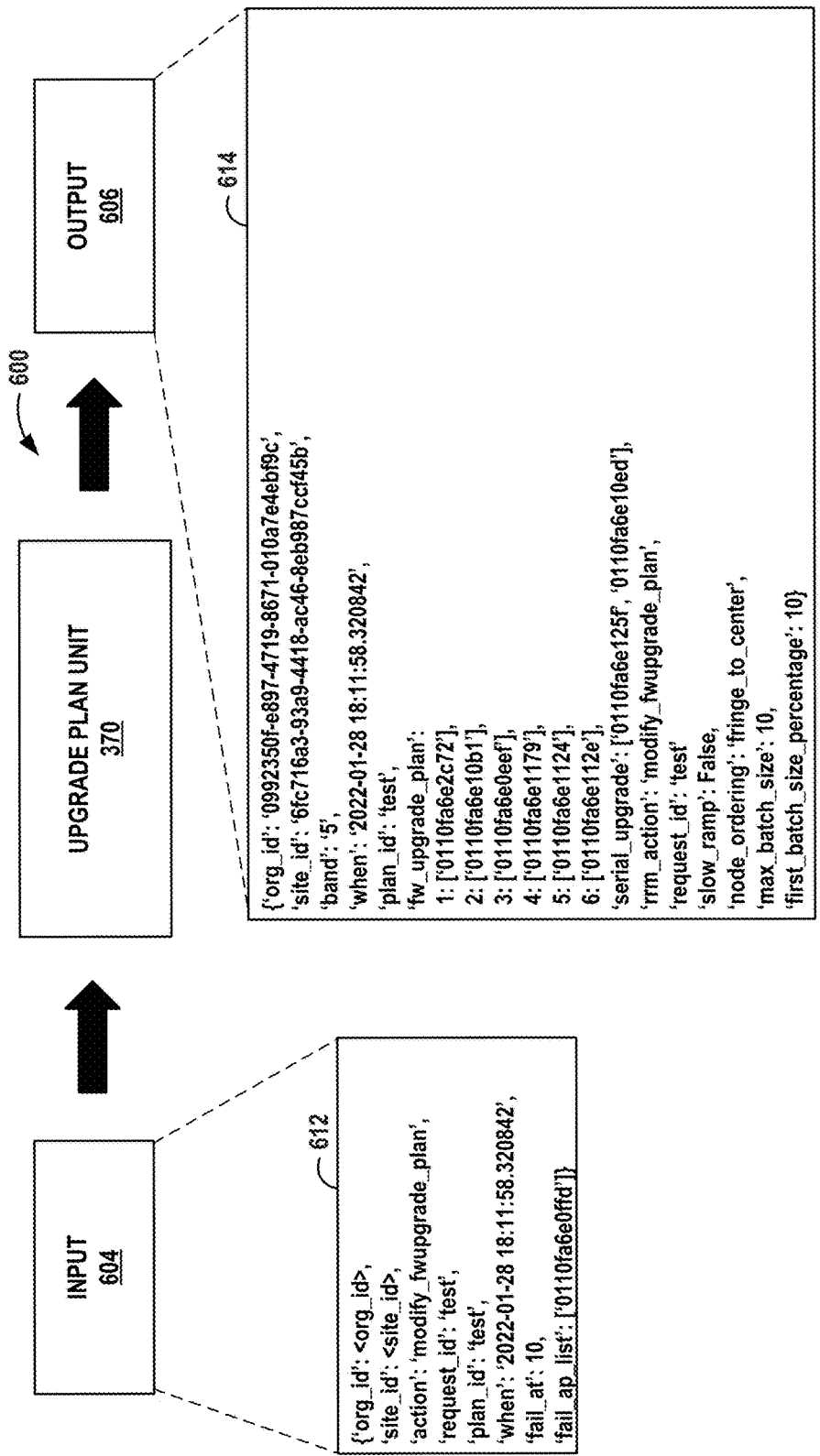

FIGS. 4A-4B illustrate examples of an input and an output of upgrade plan unit 370, in accordance with the techniques described in this disclosure. In the example of FIG. 4A, upgrade plan unit 370 may receive input 604 specifying one or more parameters used to generate an upgrade plan. In some examples, the input to upgrade planning unit 370 may include a Kafka input specifying one or more parameters to generate the upgrade plan, such as the example below:

Topology Input - rrm-action-in

| -- org id: string (nullable = false)
| -- site id: string (nullable = false)
| -- ap list: array (nullable = true) # if empty, all aps from site config will be in the upgrade plan.

| Topology Input - rrm-action-in |
| --- |
| \|    \| element: string (containsNull = true)<br>\| -- band: string (nullable = true) # 24/5/6 if empty, 5G rrm graph will be used<br>\| -- intended fw version: string (nullable = true)<br>\| -- max batch size percentage: integer (nullable = true) # max AP % in each batch<br>\| -- first batch size percentage : integer (nullable = true) #<br>\| -- slow ramp : Boolean (nullable = true) # default False<br>\| -- node order : String (nullable = true) # fringe to center or center to fringe (default fringe to center)<br>\| -- mesh upgrade : String (nullable = true) # serial or parallel default parallel (mesh aps will be added at the end of the plan (first remote and base latter) )<br>\| -- action: string (nullable = false) # generate fwupgrade plan (initial planning), modify fwupgrade_plan ( modify the plan after failure)<br>\| -- fail at: integer (nullable = true) # batch number where the failure occurs from the previous upgrade plan<br>\| -- fail ap list: array (nullable = true) # list of failure aps from the failed at batch number ( msg will be ignore if the batch number and ap list do not match)<br>   \| -- element: string (containsNull = true)<br>\| -- plan id : string (nullable = false) # for modify fwupgrade plan action, retrieve from redis cache<br>\| -- request id: string (nullable =false) # unique id for each request<br>\| -- when: string (nullable = true) # msg request time |

In the above example, the input may specify one or more parameters of the upgrade plan. For example, the input may specify an organization, a site, a list of APs (e.g., all APs in the network or select APs in the network), a frequency band (e.g., 2.4 GHz, 5 GHz, 6 GHz, etc.), an intended firmware or software version, a maximum batch size (e.g., maximum percentage of all APs in each batch), a first batch size (e.g., percentage of all APs in a first batch), whether to ramp up or ramp down the upgrade process, a node order (e.g., fringe-to-center or center-to-fringe), a mesh upgrade (e.g., serial or parallel), an action of the upgrade plan (e.g., generate an initial upgrade plan, modify an existing upgrade plan, such as after failure of the upgrade plan), a batch number where a failure had occurred from a previous upgrade plan, a list of APs associated with the batch number that failed to upgrade, an upgrade plan identifier, a request identifier for the request to generate the upgrade plan, and/or when the request to generate the upgrade plan was made. The above input is only an example of parameters of the upgrade plan, and may include more or fewer parameters, and/or other parameters, such as a direction to upgrade the APs in each cluster, a time in which to download the firmware or software, a recommended time window to execute the upgrade plan (e.g., recommended start time to execute the upgrade plan and recommended end time to stop the execution of the upgrade plan), and/or an error threshold that specifies an amount of error (e.g., number of APs that failed to upgrade) that if exceeded, would trigger the cancelation of the upgrade plan.

In some examples, an administrator may specify whether to upgrade one or more particular APs (e.g., as a list of APs) of the network or to upgrade all APs in the network. In some examples, the administrator may specify a total number of APs of a batch to be upgraded in parallel (e.g., first batch size percentage, maximum batch size percentage). In some examples, the administrator may specify a batch size as a particular number of APs or a percentage of all APs to be upgraded in parallel. The administrator may specify the number of APs to be upgraded in parallel based the level of risk and speed at which to perform the upgrade process. For instance, specifying a batch size with a fewer number of APs to be upgraded in parallel is less risky, but will be slower, whereas specifying a batch size with a greater number of APs to be upgraded in parallel is more risky, but will be faster.

In some examples, the administrator may specify whether to ramp up or ramp down the upgrade process. For example, the administrator may specify starting the upgrade process with a batch size with a fewer number of APs and ramping up the upgrade process by increasing the batch size with a greater number of APs. Alternatively, or additionally, the administrator may specify starting the upgrade process with a batch size with a larger number of APs and ramping down the upgrade process by decreasing the batch size with a fewer number of APs.

In some examples, the administrator may specify an ordered selection of the at least one AP from each of one or more clusters to perform the upgrade. For example, each cluster of strongly connected APs may be grouped around the one or more APs with the strongest connections of the group. The AP in the center of each cluster may be referred to as a "centroid" of the cluster. The administrator may specify an ordered selection to start with a selection of the AP determined to be the centroid of the cluster, followed by a selection of the next AP from the centroid of the cluster, and so on until the APs on the edge of the cluster are selected (referred to as "center-to-fringe"). Alternatively, or additionally, the administrator may specify an ordered selection to start with a selection of the AP determined to be on the edge of the cluster, followed by a selection of the next AP from the edge of the cluster, and so on until the AP determined to be the centroid of the cluster is selected (referred to as "fringe-to-center").

In some examples, the administrator may specify a direction to the ordered selection of the at least one AP from each of one or more clusters to perform the upgrade in a way that avoids upgrading neighboring edge APs of adjacent clusters at the same time since neighboring edge APs of adjacent clusters may provide backup wireless network services for one another. For example, the administrator may specify a direction to the ordered selection to start the upgrade process with an initial AP of each cluster and to subsequently perform an upgrade to APs that are to the right of the AP of each cluster being upgraded. By specifying a direction to the ordered selection of APs to perform the upgrade, upgrade plan unit 370 may generate an upgrade plan that may avoid upgrading neighboring edge APs of adjacent clusters at the same time.

In some examples, a wireless network may include a mesh network that may include one or more APs as mesh bases (e.g., AP that has a wired uplink to a switch) and/or one or more APs as mesh relays (e.g., AP that is connected to a mesh base AP), collectively referred to as mesh APs. In these examples, the administrator may specify parameters for upgrading the mesh APs. For example, the administrator may specify whether to upgrade the mesh APs serially or in parallel. Based on the parameters for upgrading the mesh APs, upgrade plan unit 370 may generate the upgrade plan that specifies upgrading the mesh APs at the end of the upgrade plan. For example, the upgrade plan may specify upgrading the mesh APs starting with the mesh relays (e.g., either serially or in parallel as specified by input 604) and then followed by the mesh bases (e.g., either serially or in parallel as specified by input 604).

In some examples, one or more parameters specified in input 604 may be undefined. In these examples, upgrade plan unit 370 may use one or more default parameters (e.g., first batch size, maximum batch size, node ordering, mesh upgrading, etc.) to generate an upgrade plan.

Based on the one or more parameters specified in input 604 and a graph of APs within the wireless network, upgrade plan unit 370 may generate output 606 representing an upgrade plan. In some examples, the output of upgrade planning unit 370 may include a Kafka output specifying the upgrade plan, such as the example below:

```
Topology Output - rrm-action-out
|-- org_id: string (nullable = false)
|-- site_id: string (nullable = false)
|-- band: string (nullable = true) # 24/5/6 if empty, 5G rrm graph will be
used
|-- intended_fw_version: string (nullable = true)
|-- timestamp: string (nullable = true) # timestamp when the plan is
generated.
|-- fw_upgrade_plan: array (nullable = true)
|    |-- element: map (containsNull = true)
|    |    |-- batch_id: integer # 1,2,3,.. etc
|    |    |-- ap_list: array (nullable = true)
|    |    |    |-- element: string (containsNull = true)
|-- recommended_start_time : string (nullable = true) # hh:mm:ss (24 hr
fmt, UTC)
|-- recommended_end_time : string (nullable= true) # hh:mm:ss (24 hr
fmt, UTC)
|-- plan_id : string (nullable = false)
|-- request_id: string (nullable=false)
|-- rrm_action : string (nullable= false) # modify_upgrade_plan,
generate_fwupgrade_plan
|-- slow_ramp : Boolean
|-- node_ordering : string
|-- max_batch_size_percentage : integer
|-- first_batch_size_percentage : integer
```

In the above example, the output may specify the parameters of the upgrade plan. For example, the output may specify the organization, the site, the band, the intended firmware or software version, a timestamp of when the upgrade plan was generated, the details of the upgrade plan (e.g., batch identifier and one or more APs associated with each batch), a recommended start time of the upgrade process, a recommended end time of the upgrade process, the upgrade plan identifier, the request identifier, the action, whether to ramp up or ramp down the upgrade process, the node order, the maximum batch size, the first batch size, and any other information specified by the one or more parameters of input 604.

In some examples, the recommended start time and recommended end time is based on input 604 specified by the administrator. In some examples, upgrade plan unit 307 may determine the recommended start time and recommended end time based on usage data of APs (e.g., amount of traffic sent and received, resource usage, etc.) and/or the number of client devices connected to the APs, etc.). For example, upgrade plan unit 370 may obtain usage data of APs and/or number of client devices connected to the APs in the wireless network and determine, based on the usage data and number of connected client devices, a period of time when the APs may be least used and/or have the least amount of connected client devices, and specify a recommended start time to execute the upgrade plan and a recommended stop time to stop the execution of the upgrade plan.

As one specific example, upgrade plan unit 370 in FIG. 4A may receive an input 604 specifying parameters to generate an upgrade plan. For example, upgrade plan unit 370 may receive input 604 specifying parameters 608 including an organization (e.g., <org_id>), a site (e.g., <site_id>), an action to generate a firmware upgrade plan (e.g., 'generate_fwupgrade_plan'), a request identifier (e.g., 'test'), a plan identifier (e.g., 'test'), and when the request was made (e.g., '2022-01-28 16:49:54.541542'). Based on parameters 608 and the graph of APs, upgrade plan unit 370 generates an output 606 representing an upgrade plan 610. In this example, upgrade plan unit 370 may generate upgrade plan 610 that specifies a band (e.g., 5), a first batch size (e.g., 10% of APs of all APs), details of the upgrade plan (e.g., one or more APs associated with a batch identifier), a mesh upgrade (e.g., serial upgrade), a maximum batch size (e.g., 10% of all APs), a node order (e.g., 'fringe_to_center'), an organization (e.g., 'org_id'), a plan identifier (e.g., 'test'), a request identifier (e.g., 'test'), an action (e.g., 'generate_fwupgrade_plan'), a site (e.g., '6fc716a3-93a-4418-a . . . b987ccf45b'), whether to ramp up/down (e.g., False), and when the request to generate the upgrade plan was made (e.g., '2022-01-28 16:49:54.541542').

In this example, each of batches one through sixteen in upgrade plan 610 specify at least one APs selected from each of one or more clusters of strongly connected APs within the graph of APs. For example, upgrade plan unit 370 may select APs '0110fa6e1241,' '0110fa6e1241', '0110fa6e1219', '0110fa6e0a30', '0110fa6e10fc' from five clusters, respectively, for a first batch; select APs '0110fa6e1138', '0110fa6e10cf', '0110fa6e1581', '0110fa6e10e8', and '0110fa6e121e' from the five clusters, respectively, for a second batch, and so on. The APs in the first batch may be APs on the edge of each cluster, and subsequent batches may be APs in the center of each cluster. In this example, upgrade plan unit 370 may specify the one or more APs in upgrade plan 610 using a Media Access Control (MAC) address or other identifier of the APs.

In the example of FIG. 4B, upgrade plan unit 370 may receive an input 604 specifying parameters to modify an existing upgrade plan 'test' (not shown). For example, upgrade plan unit 370 may receive input 604 specifying parameters 612 including an organization (e.g., <org_id>), a site (e.g., <site_id>), an action to modify an existing firmware upgrade plan (e.g., 'modify_fwupgrade_plan'), a request identifier (e.g., 'test'), a plan identifier (e.g., 'test'), when the request was made (e.g., '2022-01-28 18:11:58.320842'), the batch number where the upgrade failure occurred (e.g., 10), and the AP that failed to upgrade (e.g., '0110fa6e0ffd'). Based on parameters 612 and the graph of APs, upgrade plan unit 370 generates an output 606 representing a modified upgrade plan 614 to correct the existing upgrade plan. In this example, upgrade plan unit 370 may generate modified upgrade plan 614 that specifies an organization (e.g., '0992350f-e897-4719-8671-010a7e4ebf9c'), a site (e.g., '6fc716a3-93a9-4418-ac46-8eb987ccf45b'), a band (e.g., 5), when the request to modify the upgrade plan was made (e.g., '2022-01-28 18:11:58.320842'), a plan identifier (e.g., 'test'), details of the upgrade plan (e.g., one or more APs associated with a batch identifier), a mesh upgrade (e.g., serial upgrade), an action (e.g., 'modify_fwupgrade_plan'), the request identifier (e.g., 'test'), whether to ramp up/down (e.g., False), the node order (e.g., 'fringe_to_center'), a maximum batch size (e.g., 10% of all APs), and a first batch size (e.g., 10% of APs of all APs).

In this example, each of batches one through six in upgrade plan 614 specify a different AP for batches of the previous upgrade plan. For example, upgrade plan unit 370 may select AP '0110fa6e2c72' for a first batch, AP '0110fa6e10b1' for a second batch, AP '0110fa6e0eef' for a third batch, AP '0110fa6e1179' for a fourth batch, AP '0110fa6e1124' for a fifth batch, and AP '0110fa6e112e' for a sixth batch, and modify the existing upgrade plan (e.g., as a new plan) with these new batches starting from where the upgrade failure occurred. For example, an existing upgrade plan may include 16 steps and the plan failed at step 10. Each of batches one through six are added to the new plan (e.g., the modified plan) at steps 11 through 16.

Figure 5:
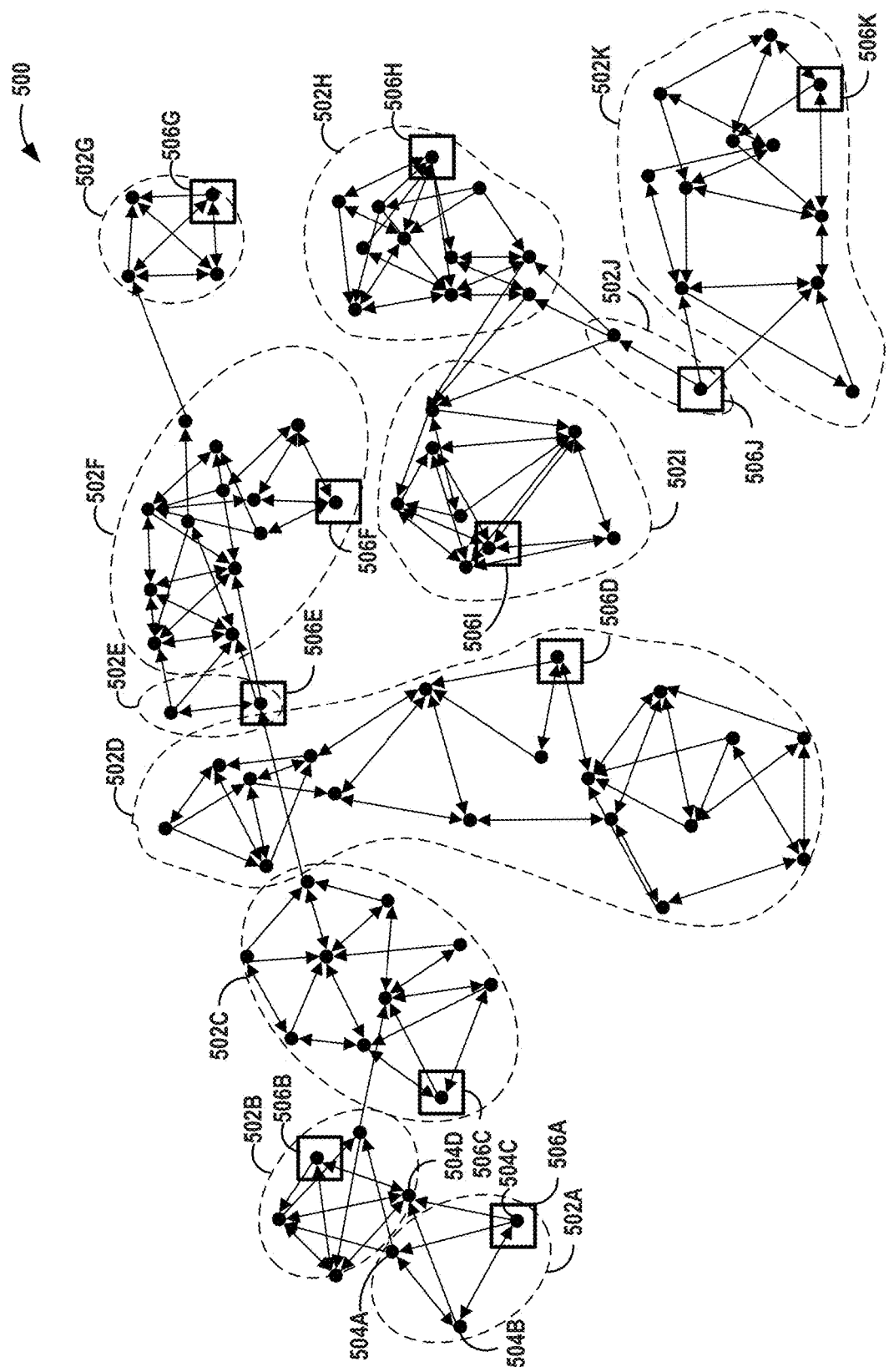
FIG. 5 illustrates an example graph used to selectively upgrade devices in a wireless network, in accordance with the techniques described in this disclosure.

FIG. 5 illustrates an example graph used to selectively upgrade devices in a wireless network, in accordance with the techniques described in this disclosure. In the example of FIG. 5, graph 500 may represent a graph of APs generated by RRM engine 360 of FIG. 3A and grouped by upgrade plan unit 370.

In the example of FIG. 5, AP devices may be represented as nodes within the graph. An AP device that detects a radio signal from another AP device is represented by a connection between nodes of the graph (e.g., arrow). The connection between nodes may also indicate which AP device detects the radio signal. For example, each of nodes 504A-504D in graph 500 may represent AP devices in the wireless network. In this example, node 504A may represent an AP device that may detect a radio signal from an AP device represented by node 504B. The AP device represented by node 504B may also detect a radio signal from the AP device represented by node 504A. As such, a connection between nodes 504A and 504B may indicate that each of the AP devices represented by nodes 504A and 504B detect a radio signal from each other. As another example, the AP device represented by node 504C may detect a radio signal from the AP device represented by node 504A, but the AP device represented by node 504A does not detect a radio signal from the AP device represented by node 504C. As such, a connection between nodes 504A and 504C may indicate that the AP device represented by node 504C detects a radio signal from the AP device represented by node 504A, and the AP device represented by node 504A does not detect a radio signal from the AP device represented by node 504C.

Grouping module 372 of upgrade plan unit 370 may group APs within graph 500 based on strength of the connectivity between the APs. As one example, grouping module 372 may group APs that have a strong connection between them (e.g., RSSI value above a particular RSSI threshold value). In some examples, grouping module 372 may implement one or more clustering algorithms including K-means, mean-shift, spectral clustering, and/or other clustering algorithms to group strongly connected APs together and/or to separate clusters of strongly connected APs from each other. In the example of FIG. 5, grouping module 372 may group APs in graph 500 into one or more clusters, e.g., clusters 502A-502K (collectively, "clusters 502"). Each of clusters 502 may comprise a subset of the plurality of APs in the wireless network. For example, grouping module 372 may group nodes 504A-504C into cluster 502A. Node 504D is not included in cluster 502A because the AP device represented by 504D does not detect radio signals (or detects a weak radio signal with an RSSI value below a particular RSSI threshold value) from the AP devices represented by nodes 504A-504C. In some examples, grouping module 372 may implement one or more clustering algorithms to group strongly connected APs together and/or to separate clusters of strongly connected APs from each other.

Selection module 374 of upgrade plan unit 370 may select at least one AP from each of one or more of clusters 502 to upgrade in batches until all APs in clusters 502 are upgraded. For example, selection module 374 may select nodes 506A-506K from clusters 502A-502K, respectively, as a first batch of APs to be upgraded. Selection module 374 may then select a different node from each of one or more clusters 502 to be upgraded in a next batch, and so on until all APs in clusters 502 are upgraded.

In some examples, selection module 374 may select the at least one AP from each of one or more cluster 502 based on configurable parameters. For example, selection module 374 may select one or more nodes within graph 500 to be included in a given batch based on a maximum batch size (e.g., maximum percentage of APs in each batch), a first batch size (e.g., percentage of APs in a first batch), whether to ramp up/down the upgrade process, a node order (e.g., fringe-to-center or center-to-fringe), a mesh upgrade (e.g., serial or parallel), a direction to upgrade the APs in each cluster, or the like. In this example, upgrade plan unit 370 may receive configurable parameters specifying a batch size (e.g., 10% of all APs) and a node order of fringe-to-center. In this example, selection module 374 may select, based on the configurable parameters, a single edge node from each of clusters 502, e.g., nodes 506, for a first batch. Selection module 374 may then select at least one other AP from each of one or more clusters 502 based on the configurable parameters until all APs of clusters 502 are selected.

Plan generation module 382 may generate the upgrade plan specifying the APs selected by selection module 374 from graph 500. For example, plan generation module 382 may generate an upgrade plan specifying batches of the APs to be upgraded in parallel.

Figure 6:
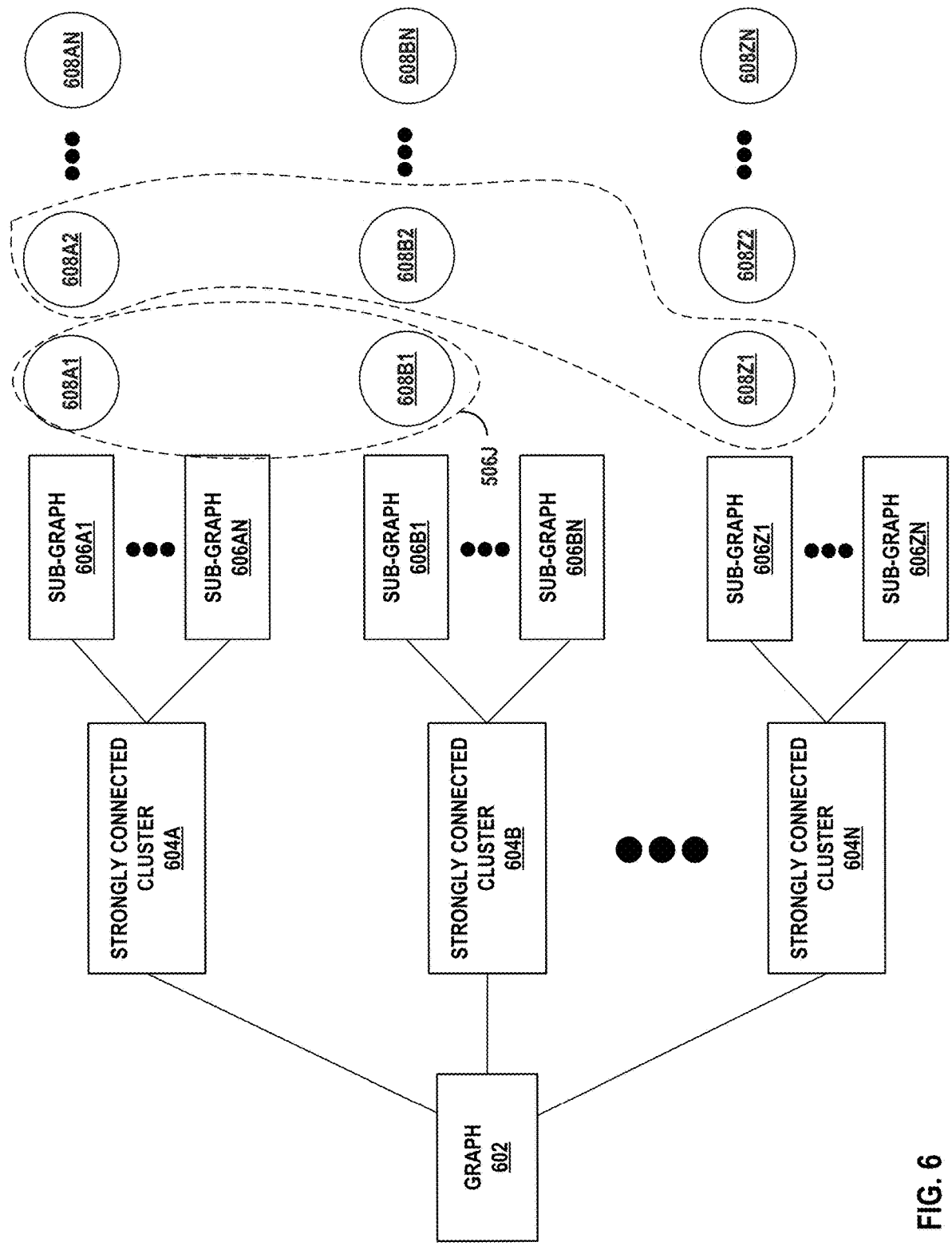
FIG. 6 is a block diagram of an example operation to group and select at least one device from each of one or more clusters, in accordance with the techniques described in this disclosure.

FIG. 6 is a block diagram of an example operation to group and select at least one AP from each of one or more clusters, in accordance with the techniques described in this disclosure. FIG. 6 is described with respect to upgrade plan unit 370 of FIGS. 3A and 3B, and graph 500 of FIG. 5.

In the example of FIG. 6, upgrade plan unit 370 may receive graph 602 (e.g., graph 500 of FIG. 5). Grouping module 372 of upgrade plan unit 370 may group APs within graph 602 based on strength of the connectivity between the APs. As one example, grouping module 372 may group APs that have a strong connection between them (e.g., RSSI value above a particular RSSI threshold value) into clusters, e.g., strongly connected clusters 604A-604N. In some examples, grouping module 372 may implement one or more clustering algorithms including K-means, mean-shift, spectral clustering, and/or other clustering algorithms to group strongly connected APs into sub-graphs (e.g., clusters 502 of FIG. 5). For example, strongly connected cluster 604A may be further subdivided into sub-graphs 606A1-606AN, strongly connected cluster 604B may be further subdivided into sub-graphs 606B1-606BN, and strongly connected cluster 604N may be further subdivided into sub-graphs 606Z1-606ZN.

Selection module 374 of upgrade plan unit 370 may select at least one AP from each of one or more clusters (e.g., sub-graphs) to upgrade in batches until all APs in the clusters are upgraded. For example, selection module 374 may select at least one AP from each of one or more clusters based on one or more configurable parameters. As one example, the administrator may specify a first batch size (e.g., 10% of all APs), to ramp up the upgrade process, and an ordered selection (e.g., fringe-to-center). In this example, selection module 374 may order the APs included in each cluster from the AP on the edge of the cluster to the AP determined to be the centroid of the cluster. For example, node 608A1 may represent an AP on the edge of sub-graph 606A1, node 608A2 may represent an AP more towards the center of the sub-graph 606A1, and node 608AN may represent the AP determined to be the centroid of the sub-graph 606A1. Similarly, node 608B1 may represent an AP on the edge of sub-graph 606B1, node 608B2 may represent an AP more towards the center of the sub-graph 606B1, and node 608BN may represent the AP determined to be the centroid of the sub-graph 606B1. Likewise, node 608Z1 may represent an AP on the edge of sub-graph 606Z1, node 608Z2 may represent an AP more towards the center of the sub-graph 606Z1, and node 608ZN may represent the AP determined to be the centroid of the sub-graph 606Z1.

Based on the first batch size (e.g., 10% of all APs) specified in the configurable parameters, selection module 374 may select one AP from each of the sub-graphs up to a maximum batch size of 10% of all APs for the first batch. For example, selection module 374 may select node 608A1 of sub-graph 606A1 and node 608B1 of sub-graph 606B1 to be included a first batch of APs to be upgraded. Based on the configurable parameters to ramp up the upgrade process, selection module 374 may select one AP from across a greater number of clusters for subsequent batches, up to the maximum batch size of 10% of all APs. For example, selection module 374 may select node 608A2 of sub-graph 608A2, node 608B2 of sub-graph 606B1, and node 608Z1 of sub-graph 606Z1 to be included in a subsequent batch of APs to be upgraded. Selection module 374 may continue to select at least one other node from each of one or more clusters to be in a next batch, and so on until all APs in the clusters are selected.

Figure 7:
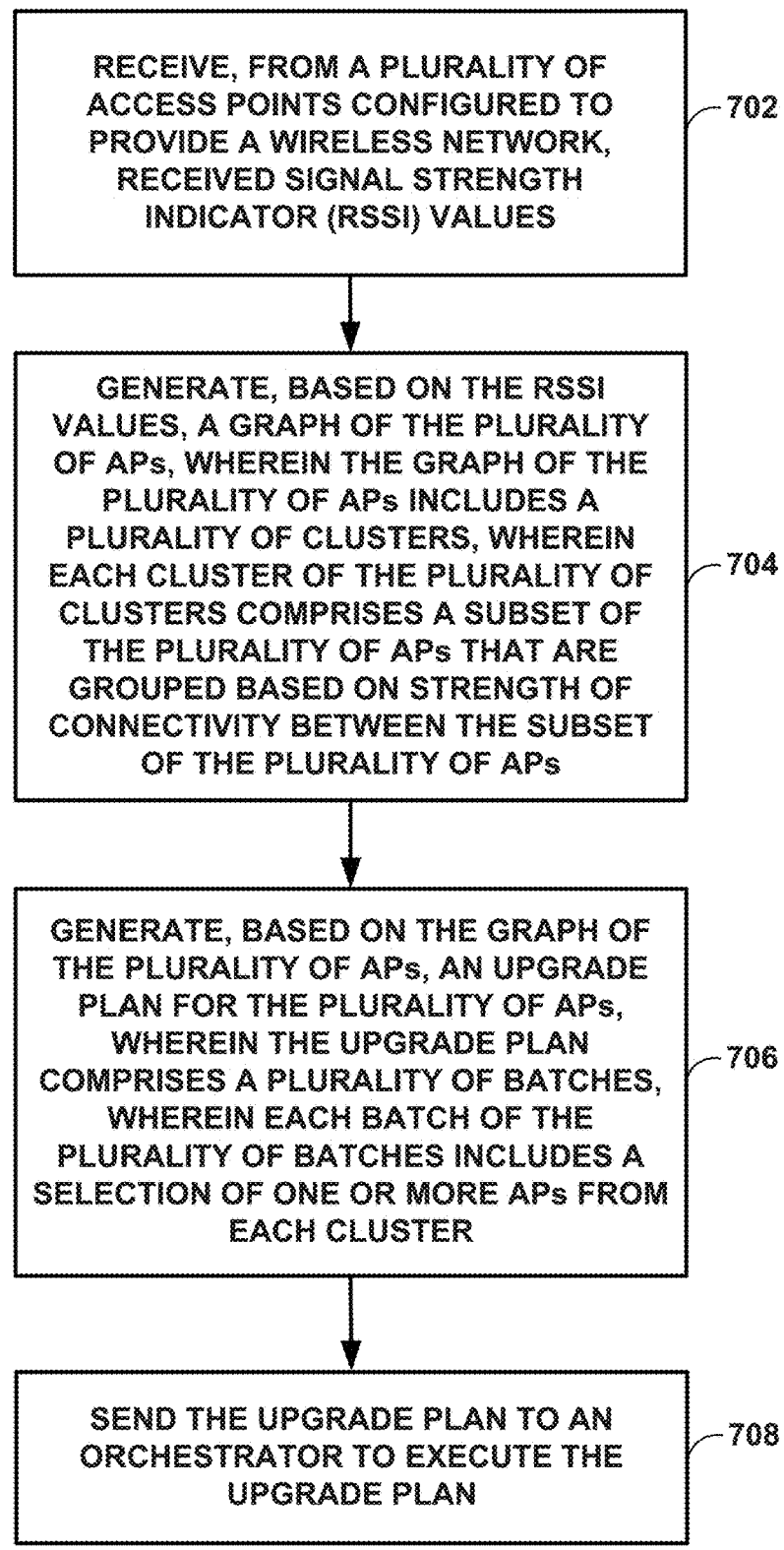
FIG. 7 is a flowchart of an example process by which a network management system provides an upgrade plan to selectively upgrade devices in a wireless network, in accordance with one or more techniques of the disclosure.

FIG. 7 is a flowchart of an example process by which a network management system provides an upgrade plan to selectively upgrade devices in a wireless network, in accordance with one or more techniques of the disclosure. FIG. 7 is described with respect to network management system 130 of FIG. 1 and network management system 300 of FIGS. 3A, 3B.

For example, NMS 300 may receive, from a plurality of access points configured to provide a wireless network, received signal strength indicator (RSSI) values (702). For example, NMS 300 may obtain RSSI values measured by the plurality of APs. NMS 300 may generate, based on the RSSI values, a graph of the plurality of APs, wherein the graph of the plurality of APs includes a plurality of clusters, wherein each cluster of the plurality of clusters comprises a subset of the plurality of APs that are grouped based on strength of connectivity between the subset of the plurality of APs (704). For example, NMS 300 includes a radio resource management engine 360 that generates a graph of the plurality of APs based on the RSSI values obtained from the plurality of APs. Upgrade plan unit 370 of NMS 300 may include a grouping module 372 configured to group APs within the RRM graph based on strength of the connectivity between the APs. As one example, grouping module 372 may group a first set of one or more APs ("first cluster") within the graph that have a strong connection (e.g., strength of connection above a particular RSSI threshold value) between each other, group a second set of one or more APs ("second cluster") within the graph that have a strong connection between each other, and so on. In some examples, grouping module 372 may implement one or more clustering algorithms including K-means, mean-shift, spectral clustering, and/or other clustering algorithms.

NMS 300 may generate, based on the graph of the plurality of APs, an upgrade plan to upgrade the plurality of APs, wherein the upgrade plan comprises a plurality of batches, wherein each batch of the plurality of batches includes a selection of at least one AP from each of one or more of the clusters to be upgraded in parallel (706). For example, NMS 300 may include a selection module 374 configured to select at least one AP from each of one or more of the clusters to upgrade in batches until all the APs in the cluster are upgraded. In some examples, selection module 374 may select the at least one AP from each of one or more of the clusters based on configurable parameters. For example, selection module 374 may select at least one APs from each of one or more of the clusters based on configurable parameters such as specifying one or more particular APs to be upgraded or to upgrade all APs in the network, the number of APs to be upgraded in parallel, an order in which to upgrade APs within each cluster, a direction in which to upgrade APs within each cluster, whether to ramp up or ramp down the upgrade process, and/or other parameters that may specify how to perform the upgrade process. In response to generating the upgrade plan, NMS 300 may send the upgrade plan to an orchestrator to execute the upgrade plan (708).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—

Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/ lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A network management system comprising:
   one or more processors; and
   a memory comprising instructions that when executed by the one or more processors cause the one or more processors to:
   receive, from a plurality of access points (APs) configured to provide a wireless network, received signal strength indicator (RSSI) values that each specify a strength of a radio signal detected by an AP of the plurality of APs from another AP of the plurality of APs;
   generate, based on the RSSI values, a graph of the plurality of APs, wherein the graph of the plurality of APs includes a plurality of clusters, wherein each cluster of the plurality of clusters comprises a subset of strongly connected APs of the plurality of APs that are grouped based on RSSI values of signals detected by the subset of strongly connected APs satisfying a threshold value;
   generate, based on the graph of the plurality of APs, an upgrade plan to upgrade the plurality of APs, wherein the upgrade plan comprises a plurality of batches, wherein each batch of the plurality of batches includes a selection of at least one AP from each cluster of the plurality of clusters to be upgraded in parallel; and
   send the upgrade plan to an orchestrator to execute the upgrade plan.

2. The network management system of claim 1,
   wherein to generate the upgrade plan, the instructions further cause the one or more processors to generate the upgrade plan based on one or more configurable parameters,
   wherein the one or more configurable parameters comprise a node order,
   wherein the node order starts with a selection of an edge node of each cluster and ends with a center node of each cluster,
   wherein to generate the upgrade plan based on the node order, the instructions further cause the one or more processors to:
   generate a first batch comprising an AP represented by an edge node of a given cluster;
   generate a second batch comprising an AP represented by a center node of the given cluster, wherein the second batch is upgraded subsequent to the first batch.

3. The network management system of claim 1,
   wherein to generate the upgrade plan, the instructions further cause the one or more processors to generate the upgrade plan based on one or more configurable parameters,
   wherein the one or more configurable parameters comprise a node order,
   wherein the node order starts with a selection of a center node of each cluster and ends with an edge node of each cluster,
   wherein to generate the upgrade plan based on the node order, the instructions further cause the one or more processors to:
   generate a first batch comprising an AP represented by a center node of a given cluster;
   generate a second batch comprising an AP represented by an edge node of the given cluster, wherein the second batch is upgraded subsequent to the first batch.

4. The network management system of claim 1,
   wherein to generate the upgrade plan, the instructions further cause the one or more processors to generate the upgrade plan based on one or more configurable parameters,
   wherein the one or more configurable parameters comprises a specification to ramp up the upgrade plan,
   wherein to generate the upgrade plan based on the specification to ramp up the upgrade plan, the instructions further cause the one or more processors to:
   generate a first batch comprising at least one AP from each of one or more clusters;
   generate a second batch comprising at least one AP from each of a greater number of clusters than the first batch, wherein the second batch is upgraded subsequent to the first batch.

5. The network management system of claim 1,
wherein to generate the upgrade plan, the instructions further cause the one or more processors to generate the upgrade plan based on one or more configurable parameters,
wherein the one or more configurable parameters comprises a specification to ramp down the upgrade plan,
wherein to generate the upgrade plan based on the specification to ramp down the upgrade plan, the instructions further cause the one or more processors to:
generate a first batch comprising at least one AP from each of one or more clusters;
generate a second batch comprising at least one AP from each of a lesser number of clusters than the first batch, wherein the second batch is upgraded subsequent to the first batch.

6. The network management system of claim 1,
wherein to generate the upgrade plan, the instructions further cause the one or more processors to generate the upgrade plan based on one or more configurable parameters,
wherein the one or more configurable parameters comprises a recommended time window to execute the upgrade plan,
wherein to generate the upgrade plan based on the recommended time window, the instructions further cause the one or more processors to:
obtain usage data of the plurality of APs or a number of connected client devices to the plurality of APs;
determine, based on the usage data of the plurality of APs or the number of connected client devices to the plurality of APs, a start time to execute the upgrade plan; and
determine, based on the usage data of the plurality of APs or the number of connected client devices to the plurality of APs, an end time to stop execution of the upgrade plan.

7. The network management system of claim 1,
wherein to generate the upgrade plan, the instructions further cause the one or more processors to generate the upgrade plan based on one or more configurable parameters,
wherein the one or more configurable parameters comprise one or more of a maximum batch size or a first batch size,
wherein the maximum batch size specifies a maximum percentage of the plurality of APs to be included in each batch, and
wherein the first batch size specifies a percentage of the plurality of APs to be included in a first batch of the plurality of batches.

8. The network management system of claim 1, wherein to generate the graph of the plurality of APs, the instructions further cause the one or more processors to:
determine, based on the RSSI values, an AP of the plurality of APs detects a plurality of radio signals from other APs of the plurality of APs; and
filter, based on the RSSI values, the graph of the plurality of APs to include a subset of the other APs, wherein the subset of the other APs are associated with highest RSSI values among the other APs.

9. The network management system of claim 1, wherein the upgrade plan comprises a batch of one or more APs of the plurality of APs operating as mesh relays and a batch of one or more APs of the plurality of APs operating as mesh bases.

10. The network management system of claim 1, wherein each batch of the plurality of batches is upgraded serially in the upgrade plan.

11. A method comprising:
receiving, from a plurality of access points (APs) configured to provide a wireless network, received signal strength indicator (RSSI) values that each specify a strength of a radio signal detected by an AP of the plurality of APs from another AP of the plurality of APs;
generating, based on the RSSI values, a graph of the plurality of APs, wherein the graph of the plurality of APs includes a plurality of clusters, wherein each cluster of the plurality of clusters comprises a subset of strongly connected APs of the plurality of APs that are grouped based on RSSI values of signals detected by the subset of strongly connected APs satisfying a threshold value;
generating, based on the graph of the plurality of APs, an upgrade plan to upgrade the plurality of APs, wherein the upgrade plan comprises a plurality of batches, wherein each batch of the plurality of batches includes a selection of at least one AP from each cluster of the plurality of clusters to be upgraded in parallel; and
sending the upgrade plan to an orchestrator to execute the upgrade plan.

12. The method of claim 11,
wherein generating the upgrade plan comprises generating the upgrade plan based on one or more configurable parameters,
wherein the one or more configurable parameters comprise a node order,
wherein the node order starts with a selection of an edge node of each cluster and ends with a center node of each cluster,
wherein generating the upgrade plan based on the node order comprises:
generating a first batch comprising an AP represented by an edge node of a given cluster;
generating a second batch comprising an AP represented by a center node of the given cluster, wherein the second batch is upgraded subsequent to the first batch.

13. The method of claim 11,
wherein generating the upgrade plan comprises generating the upgrade plan based on one or more configurable parameters,
wherein the one or more configurable parameters comprise a node order,
wherein the node order starts with a selection of a center node of each cluster and ends with an edge node of each cluster,
wherein generating the upgrade plan based on the node order comprises:
generating a first batch comprising an AP represented by a center node of a given cluster;
generating a second batch comprising an AP represented by an edge node of the given cluster, wherein the second batch is upgraded subsequent to the first batch.

14. The method of claim 11,
wherein generating the upgrade comprises generating the upgrade plan based on one or more configurable parameters,
wherein the one or more configurable parameters comprises a specification to ramp up the upgrade plan, wherein generating the upgrade plan based on the specification to ramp up the upgrade plan comprises:
  generating a first batch comprising at least one AP from each of one or more clusters;
  generating a second batch comprising at least one APs from each of a greater number of clusters than the first batch, wherein the second batch is upgraded subsequent to the first batch.

15. The method of claim 11,
wherein generating the upgrade comprises generating the upgrade plan based on one or more configurable parameters,
wherein the one or more configurable parameters comprises a specification to ramp down the upgrade plan,
wherein generating the upgrade plan based on the specification to ramp down the upgrade plan comprises:
  generating a first batch comprising at least one AP from each of one or more clusters;
  generating a second batch comprising a at least one AP from each of one or more lesser number of clusters than the first batch, wherein the second batch is upgraded subsequent to the first batch.

16. The method of claim 11,
wherein generating the upgrade comprises generating the upgrade plan based on one or more configurable parameters,
wherein the one or more configurable parameters comprises a recommended time window to execute the upgrade plan,
wherein generating the upgrade plan based on the recommended time window comprises:
  obtaining usage data of the plurality of APs or a number of connected client devices to the plurality of APs;
  determining, based on the usage data of the plurality of APs or the number of connected client devices to the plurality of APs, a start time to execute the upgrade plan; and
  determining, based on the usage data of the plurality of APs or the number of connected client devices to the plurality of APs, an end time to stop execution of the upgrade plan.

17. The method of claim 11,
wherein the maximum batch size specifies a maximum percentage of the plurality of APs to be included for each batch, and
wherein the first batch size specifies a percentage of the plurality of APs to be included in a first batch of the plurality of batches.

18. The method of claim 11, wherein generating the graph of the plurality of APs comprises:
  determining, based on the RSSI values, an AP of the plurality of APs detects a plurality of radio signals from other APs of the plurality of APs; and
  filtering, based on the RSSI values, the graph of the plurality of APs to include a subset of the other APs, wherein the subset of the other APs are associated with highest RSSI values among the other APs.

19. The method of claim 11, wherein each batch of the plurality of batches is upgraded serially in the upgrade plan.

20. Non-transitory computer-readable storage media comprising instructions that, when executed, configure processing circuitry to:
  receive, from a plurality of access points (APs) configured to provide a wireless network, received signal strength indicator (RSSI) values that each specify a strength of a radio signal detected by an AP of the plurality of APs from another AP of the plurality of APs;
  generate, based on the RSSI values, a graph of the plurality of APs, wherein the graph of the plurality of APs includes a plurality of clusters, wherein each cluster of the plurality of clusters comprises a subset of strongly connected APs of the plurality of APs that are grouped based on RSSI values of signals detected by the subset of strongly connected APs satisfying a threshold value;
  generate, based on the graph of the plurality of APs, an upgrade plan to upgrade the plurality of APs, wherein the upgrade plan comprises a plurality of batches, wherein each batch of the plurality of batches includes a selection of at least one AP from each cluster of the plurality of clusters to be upgraded in parallel; and
  send the upgrade plan to an orchestrator to execute the upgrade plan.

* * * * *